United States Patent
Wilson

(10) Patent No.: US 9,965,932 B2
(45) Date of Patent: *May 8, 2018

(54) ALARM SYSTEM AND METHOD

(71) Applicant: Edwin Prugh Wilson, Pittsburgh, PA (US)

(72) Inventor: Edwin Prugh Wilson, Pittsburgh, PA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/473,175

(22) Filed: Mar. 29, 2017

(65) Prior Publication Data

US 2017/0206758 A1   Jul. 20, 2017

Related U.S. Application Data

(63) Continuation of application No. 14/810,020, filed on Jul. 27, 2015, now Pat. No. 9,613,507.

(51) Int. Cl.
| | | |
|---|---|---|
| *G08B 13/14* | (2006.01) | |
| *H04W 52/02* | (2009.01) | |
| *G08B 13/196* | (2006.01) | |
| *H04W 4/02* | (2018.01) | |
| *H04W 4/20* | (2018.01) | |

(52) U.S. Cl.
CPC ....... *G08B 13/14* (2013.01); *G08B 13/19695* (2013.01); *H04W 4/02* (2013.01); *H04W 52/0261* (2013.01); *H04W 4/20* (2013.01)

(58) Field of Classification Search
None
See application file for complete search history.

(56) References Cited

U.S. PATENT DOCUMENTS

| | | | |
|---|---|---|---|
| 8,452,868 B2 | 5/2013 | Shafer | |
| 8,717,172 B2 | 5/2014 | Parker | |
| 8,943,352 B1* | 1/2015 | Warneke | G06F 1/3234 327/113 |
| 9,263,898 B1* | 2/2016 | Ghazarian | H02J 7/0019 |
| 2004/0180668 A1 | 9/2004 | Owens | |
| 2005/0017899 A1 | 1/2005 | Cervinka | |
| 2005/0046580 A1 | 3/2005 | Miranda-Knapp | |
| 2008/0224868 A1 | 9/2008 | Huang | |
| 2009/0040954 A1* | 2/2009 | Usuba | H04W 48/08 370/311 |
| 2010/0148966 A1 | 6/2010 | Vuppala | |
| 2010/0298999 A1* | 11/2010 | Allgaier | G06F 1/3203 700/296 |
| 2011/0187542 A1* | 8/2011 | Dittmer | H05B 37/0272 340/628 |

(Continued)

*Primary Examiner* — George Bugg
*Assistant Examiner* — Renee Dorsey
(74) *Attorney, Agent, or Firm* — Ansel M. Schwartz

(57) ABSTRACT

An alarm system includes a detector positioned to detect when an object experiences an unauthorized removal and which produces an alarm signal when the object experiences an unauthorized removal. The alarm system includes a global positioning system (GPS) and a transmitter in communication with the detector which transmits wirelessly an alarm alert signal with coordinates of the transmitter's location when the transmitter receives the alarm signal. The alarm system includes a power supply control portion in communication with the transmitter which controls power to the transmitter. A method for protecting an object.

5 Claims, 2 Drawing Sheets

(56) References Cited

U.S. PATENT DOCUMENTS

| | | | |
|---|---|---|---|
| 2013/0069776 A1* | 3/2013 | Haber | B60R 25/403 340/463 |
| 2013/0335223 A1 | 12/2013 | Brown | |
| 2014/0109631 A1 | 4/2014 | Asquith | |
| 2014/0300473 A1 | 10/2014 | Vatn | |

* cited by examiner

ALARM SYSTEM AND METHOD

CROSS-REFERENCE TO RELATED APPLICATIONS

This is a continuation of U.S. patent application Ser. No. 14/810,020 filed Jul. 27, 2015, now U.S. Pat. No. 9,613,507, incorporated by reference herein.

FIELD OF THE INVENTION

The present invention is related to protecting an object with a detector which causes a cell phone to transmit an alarm when the object is removed without authorization. (As used herein, references to the "present invention" or "invention" relate to exemplary embodiments and not necessarily to every embodiment encompassed by the appended claims.) More specifically, the present invention is related to protecting an object with a detector which causes a cell phone to transmit an alarm when the object is removed without authorization and the coordinates of the cell phone using a GPS of the cell phone utilizing an automatic on/off battery saving control mechanism.

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

Typically, in the alarm industry, either a detection device has to be hard hardwired to an alarm CPU or connected to it via a small range wireless device because the detection device needs to be in close proximity to a reporting device. The typical alarm system supervised wireless device can only transmit about 1000 feet max in ideal conditions. When used indoors, the wireless range is substantially less due to having to pass the weak signal through various types of construction material. Many older buildings have metal lath walls and/or asbestos in their return air areas making running wires uneconomical and causing typical short range wireless transmitters to have a very limited range.

The system is able to overcome the small range problem as well as the problem of having a typical cell phone type of wireless device use up its standby battery life which usually is only a few days at most.

BRIEF SUMMARY OF THE INVENTION

The present invention pertains to an alarm system. The alarm system comprises a detector positioned to detect when an object experiences an unauthorized removal and which produces an alarm signal when the object experiences an unauthorized removal. The alarm system comprises a cell phone with global positioning system (GPS) in communication with the detector which transmits wirelessly an alarm alert signal with coordinates of the cell phone's location when the cell phone receives the alarm signal. The alarm system comprises a power supply control portion in communication with the the cell phone which controls power to the cell phone The present invention pertains to a method for protecting an object. The method comprises the steps of controlling power to a cell phone with a power supply control portion in communication with the cell phone which controls power to the cell phone. There is the step of detecting with a detector when the object experiences an unauthorized removal and which produces an alarm signal when the object experiences an unauthorized removal. There is the step of transmitting wirelessly with the cell phone with GPS in communication with the detector an alarm alert signal with coordinates of the cell phone's location when the cell phone receives the alarm signal.

BRIEF DESCRIPTION OF THE SEVERAL VIEWS OF THE DRAWING

In the accompanying drawings, the preferred embodiment of the invention and preferred methods of practicing the invention are illustrated in which.

DETAILED DESCRIPTION OF THE INVENTION

Figure 1A:
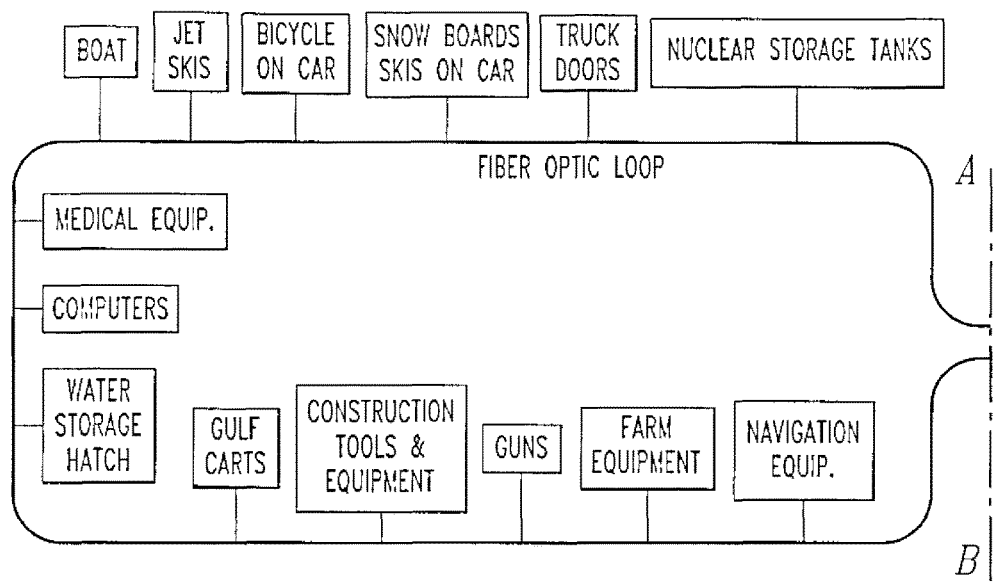
FIGS. 1A and 1B together are a block diagram of the alarm system of the present invention.
Figure 1B:
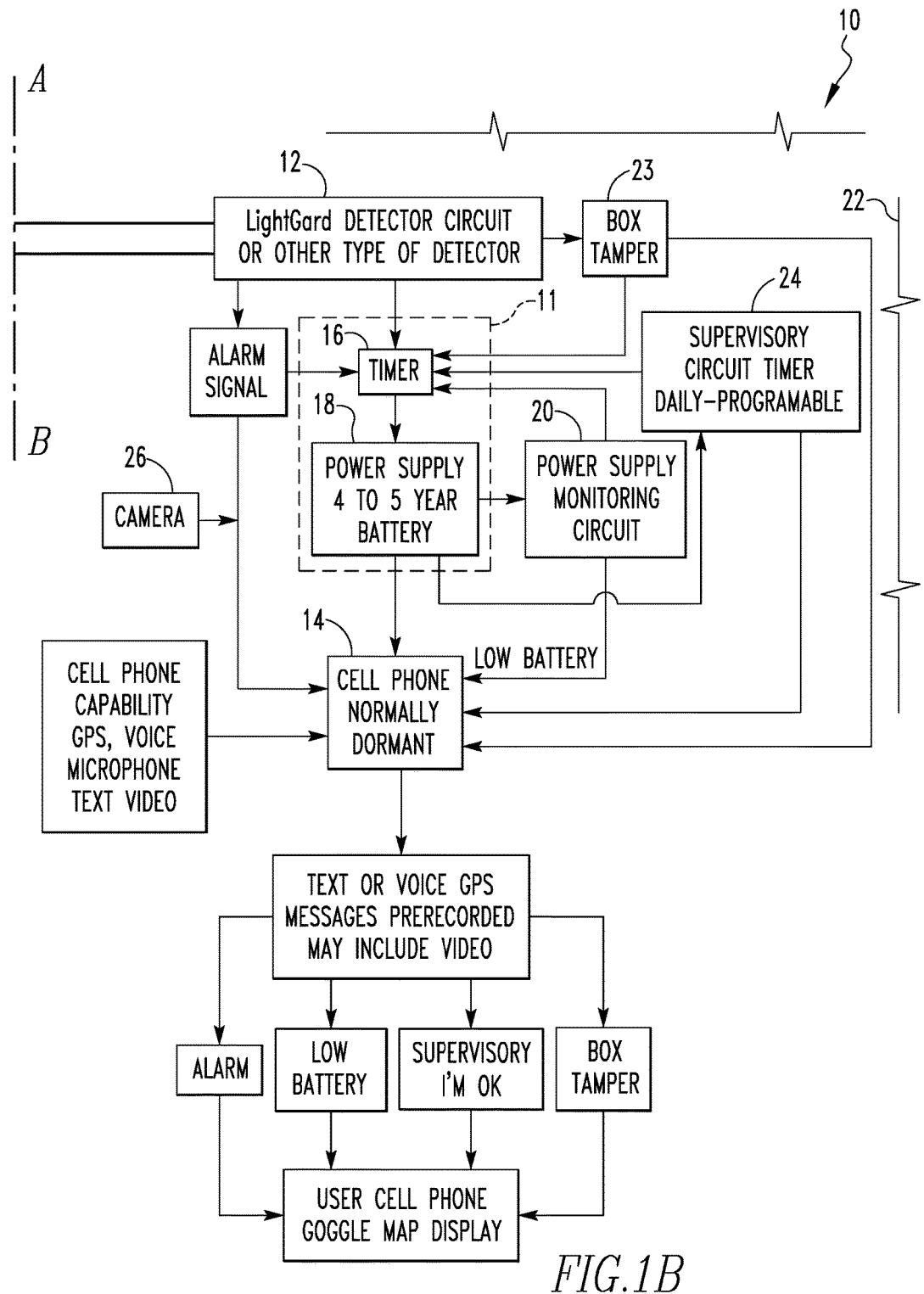

Referring now to the drawings wherein like reference numerals refer to similar or identical parts throughout the several views, and more specifically to FIGS. 1A and 1B thereof, there is shown an alarm system 10. The alarm system 10 comprises a detector 12 positioned to detect when an object experiences an unauthorized removal and which produces an alarm signal when the object experiences an unauthorized removal. The alarm system 10 comprises a cell phone 14 with global positioning system (GPS) in communication with the detector 12 which transmits wirelessly an alarm alert signal with coordinates of the cell phone's 14 location when the cell phone 14 receives the alarm signal. The transmission is typically at 1, 2 5, or 10 or even more than 100 miles to a receiver that receives the transmission and recognizes the alarm has been tripped (sounded) as well as the location of the cell phone 14. The alarm system 10 comprises a power supply control portion 11 in communication with the cell phone which controls power to the cell phone.

The power supply control portion 11 may include a timer 16 in communication with the detector 12 and a power supply 18 in communication with the timer 16 and the cell phone 14. When the timer 16 receives the alarm signal, the timer 16 activates the power supply 18 for a predetermined period of time and the power supply 18 powers the cell phone 14 to an active state for a predetermined period of time to transmit the alarm alert signal; after the predetermined period of time, the power supply 18 turns off power to the cell phone 14 and the cell phone 14 turns off to a dormant state. This provides for automatic on/off battery saving control.

The system 10 may include a power supply 18 monitoring circuit 20 in communication with the power supply 18 and the timer 16 and the cell phone 14 which monitors the power supply 18 and produces a low battery signal when the power supply 18 monitoring circuit 20 detects the power supply 18 has a power level below a predetermined power level and provides the low battery signal to the timer 16 and the cell phone 14 causing the timer 16 to activate the power supply 18 for the predetermined period of time to power the cell phone 14 to the active state so the cell phone 14 transmits wirelessly a low battery alert signal with coordinates of the cell phone's 14 location when the cell phone 14 receives the low battery signal.

The system 10 may include a box 22 in which the cell phone 14 is disposed, and a box 22 tamper circuit 23 In communication the timer 16 and the cell phone 14 and the power supply 18 that detects when the box 22 is being tampered with and produces a box 22 tamper signal when the box 22 is tampered with and provides the box 22 tamper signal to the timer 16 and the cell phone 14 causing the timer 16 to activate the power supply 18 for the predetermined period of time to power the cell phone 14 to the active state so the cell phone 14 transmits wirelessly a box 22 tamper alert signal with coordinates of the cell phone's 14 location when the cell phone 14 receives the box 22 tamper alert signal.

The system 10 may include a supervisory circuit 24 in communication with the timer 16 and the cell phone 14 and the power supply 18 which produces at predetermined intervals a status signal that indicates the system 10 is operating properly, and provides the status signal to the timer 16 and the cell phone 14 causing the timer 16 to activate the power supply 18 for the predetermined time period to power the cell phone 14 to the active state so the cell phone 14 transmits wirelessly a status alert signal with coordinates of the cell phone's 14 location when the cell phone 14 receives the status signal.

The system 10 may include a camera 26 in communication with the detector 12 and the power supply 18 and the cell phone 14 which takes a picture of the object when the camera 26 receives the alarm signal and provides the picture to the cell phone 14 for the cell phone 14 to transmit wirelessly the picture as part of the alarm alert signal.

The alarm alert signal, the low battery alert signal and the status alert signal each may include a respective recorded text message. The alarm alert signal, the low battery alert signal and the status alert signal each includes a respective recorded voice message.

The present invention pertains to a method for protecting an object. The method comprises the steps of controlling power to a cell phone with a power supply control portion in communication with the cell phone which controls power to the cell phone. There is the step of detecting with a detector 12 when the object experiences an unauthorized removal and which produces an alarm signal when the object experiences an unauthorized removal. There is the step of transmitting wirelessly with the cell phone 14 with GPS in communication with the detector 12 an alarm alert signal with coordinates of the cell phone's 14 location when the cell phone 14 receives the alarm signal.

In the operation of the invention, for instance, the fiber optic loop of a LightGard detector 12 pulses some visible light about twice a second. If the detector 12 does not receive the pulse at the same time that the sender sends the light pulse, then that becomes an alarm.

The timer 16 just sits there un-energized. When the LightGard or other type of detector 12 senses an alarm situation it also allows or sends power to the timer 16 which in turn allows power to the cell phone 14. Likewise, if a tamper sensor trips it also sends power to the timer 16 to allow power to start the cell phone 14. Another adjustable timer 16 is timing the supervisory circuit 24 which may only make the cell phone 14 call once a day to say everything is OK. If the low battery sensor senses a low battery which may not occur for 4 years, then it starts the timer 16 to allow the power supply 18 to send power to the cell phone 14.

The timer 16 does not have to pulse on every few seconds. The timer 16 just sits there and waits for a voltage that turns it on. It then is set to remain on long enough for the cell phone 14 to receive power from the power supply 18 long enough to send its message and then turns off to save battery life. The initiating voltage would arrive if any of the various alarm sensors sends it.

If the timer 16 receives an alarm signal because the detector 12 has detected an alarm condition, or the timer 16 has received a low battery indication signal from the power supply 18 monitoring circuit 20, or the timer 16 has received an "okay" signal from the supervisory circuit 24 timer 16, or the timer 16 has received a box 22 tamper signal from the box 22 tamper sensor that the box 22 has been tampered with, the timer 16 sends an activation signal, such as a voltage signal, to the power supply 18 to cause the power supply 18 to provide power to the cell phone 14 to activate the cell phone 14. The cell phone 14 will then transmit a text or voice message stored in the memory of the cell phone 14 associated with the activation signal that triggered the timer 16 to activate the power supply 18. If it is an alarm signal, or a low battery signal, or a supervisory "okay" signal, or a box 22 tamper signal that activated the timer 16, then the cell phone 14 will transmit a text or voice message that has been pre-recorded associated with an alarm signal or a low battery signal or an "I'm okay" signal or a box 22 tamper signal, respectively. Along with whatever text or voice message is transmitted, will also be the GPS coordinates of the system 10 at the time of transmission.

If desired, there can be a camera 26 in communication with the box 22 housing the system 10 components that takes either a still picture, or a video picture of the object or objects being protected and provides such picture also to the cell phone 14 to be transmitted by the cell phone 14 along with the text or voice message and the GPS coordinates. The camera 26 can take several still photos over the course of about a minute, or several short videos over several minutes and provides them to the cell phone 14 to be transmitted. The camera 26 would be positioned in such a way that it would have a view of the object or objects being protected. The camera 26 can be disposed within the box 22, where the box 22 has a transparent portion that allows the camera 26 to see through the box 22 wall, or the camera 26 can be positioned separately from the box 22 and connected to the processor of the cell phone 14 by a cable or wirelessly. The camera 26 is electrically connected to the power supply 18 to receive power from the power supply 18 when the timer 16 is activated.

After a predetermined period of time has passed from the time the timer 16 has received the activation signal, the timer 16 will revert back to its steady-state mode where it waits and watches for another activation signal and turns off the power supply 18 from powering the cell phone 14 and the camera 26.

The box 22 that houses the component circuitry will most likely be a plastic NEMA style waterproof box 22. Being plastic will allow the radio signal from the cell phone 14 to be transmitted out of the box 22. The box 22 tamper of the box 22 is disposed inside the box 22 and detects if the box 22 is opened in any way other than with the proper key or combination opening the box 22.

The system 10 is designed to overcome the problem of having to have a detection device in close proximity to a reporting device. Typically, in the alarm industry, either a detection device has to be hard hardwired to an alarm CPU or connected to it via a small range wireless device. The typical alarm system 10 supervised wireless device can only transmit about 1000 feet max in ideal conditions. When used indoors, the wireless range is substantially less due to having to pass the weak signal through various types of construction material. Many older buildings have metal lath walls and/or asbestos in their return air areas making running wires uneconomical and causing typical short range wireless transmitters to have a very limited range.

The system 10 is able to overcome the small range problem as well as the problem of having a typical cell phone 14 type of wireless device use up its standby battery life which usually is only a few days at most. With the system 10, the cell phone 14 remains dormant until it is required to transmit. At the time that it does transmit, it only uses a small portion of its battery life since it is only allowed to remain on for a few seconds as it transmits its prerecorded information. The anticipated battery life will therefore be extended to perhaps 4 to 5 years.

In FIGS. 1A and 1B, which are block diagrams of the system 10, a typical LightGard Fiber Optic security detector 12 is used, since it has so many unique applications. However, any type of detector 12 could be used. Shown on the block diagram are a number of items that the Fiber Optic Loop type of detection is uniquely adept at monitoring. Guns, Nuclear Storage Tanks, 18 Wheeler Truck Doors, Farm Equipment, Navigation Equipment on Boats, Construction Tools and Equipment at remote Construction Sites, Water Storage Hatch Doors, Golf Carts, Computers, Medical Equipment, Lab Equipment, Video Projectors, Jet Skis, Bicycles mounted on Cars, Boats, Motors, Snow boards and Skis on car roof or rear racks, and many more types of items.

When the detector 12 detects a violation, the timer 16 is started which allows the standby battery power to supply battery power to the cell phone 14 for a limited time while the cell phone 14 reports its data. The alarm signal also is transmitted to the cell phone 14 so the violation can be reported.

There is a Power supply 18 monitoring circuit 20 that monitors the status of the battery and sends an alarm signal to the cell phone 14 when the battery voltage is getting low. This circuit also starts the Timer 16 that turns on the Power supply 18 to the Cell Phone 14.

There also is a Supervisory circuit 24 Timer 16 that turns on the Timer 16 to power the Cell Phone 14 and to have the Cell Phone 14 send a signal that the system 10 is alive and well. This can be programmable so that the User can program how often these supervisory signals are to be sent.

The Cell Phone 14 has the capability of GPS location, Text Messaging, Voice, Microphone, and Video. Appropriate Messages are recorded in Voice or Text to report whatever the situation is. These typically will be Alarm, and yourself Low Battery, and Supervisory (TM OK), or Video of what is taking place.

The Cell Phone 14 that receives these messages will have the ability to Read or Hear or See the messages as well as the ability to display a Google Map of the location of the GPS signal that is sent by the Cell Phone 14.

What this system 10 provides is a way to report from remote locations (provided that there is Cell Phone 14 and GPS coverage) over long distances. A typical Water Storage Tank is out in the woods on top of a hill somewhere without any AC power to provide power to an Alarm system 10. With this new system 10, the storage area can be miles and miles away from the person monitoring it. It also provides for coverage of an 18 Wheeler Truck that is traveling across the country and its cargo can be monitored for theft. Likewise, an expensive Bicycle or Skis or Snowboards that might be carried on the top of back of a car can be protected and monitored when the owner stops at a restaurant for a meal. Boats with expensive Navigation Equipment can be docked at a Marina and valuable accessories can be monitored even though the boat may move from one Marina to another. Construction Equipment or Farm Equipment out in a field can be monitored. Medical Equipment with Nuclear Core Devices can be moved around inside of a Hospital and be monitored wherever they are. Computers might be located in the stack area of a large library and still be monitored even though they are far removed from the checkout desk at the lobby. The system 10 is not limited to the above examples.

In regard to the multitude of applications for the system 10, such as the ones described in the previous paragraph as well as many others, typically the system 10 is used in the following way. A detector 12, such as the LightGard detector 12, has its fiber optic cable extend about the object or objects being protected. This is commonly done with an attachment that fits to the object and holds the fiber optic cable to the object. If the object is stolen, the fiber optic cable is broken, causing an alarm signal to be produced by the detector 12. See U.S. Pat. No. 6,927,690, incorporated by reference herein. The LightGard detector 12 is but one type of detector 12 from which essentially any type of detector 12 may be used with the system 10.

Typically, with this system 10 there is NO need to pay a Monitoring Service a monthly fee which today usually is $20 to $30 per month.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. An alarm system comprising:

a detector positioned to detect when an object experiences an unauthorized removal and which produces an alarm signal when the object experiences an unauthorized removal;

a global positioning system (GPS) and a transmitter in communication with the detector which transmits wirelessly an alarm alert signal with coordinates of the transmitter's location when the transmitter receives the alarm signal;

a power supply control portion in communication with the transmitter which controls power to the transmitter;

wherein the power supply control portion includes a timer in communication with the detector and a power supply in communication with the timer and the transmitter, when the timer receives the alarm signal, the timer activates the power supply for a predetermined period of time and the power supply powers the transmitter to an active state for a predetermined period of time to transmit the alarm alert signal, after the predetermined period of time the power supply turns off power to the transmitter and the transmitter turns off to a dormant state;

a power supply monitoring circuit in communication with the power supply and the timer and the transmitter which monitors the power supply and produces a low battery signal when the power supply monitoring circuit detects the power supply has a power level below a predetermined power level and provides the low battery signal to the timer and the transmitter causing the timer to activate the power supply for the predetermined period of time to power the transmitter to the active state so the transmitter transmits wirelessly a low battery alert signal with coordinates of the transmitter's location when the transmitter receives the low battery signal;

a box in which the transmitter is disposed, and a box tamper circuit In communication the timer and the transmitter and the power supply that detects when the box is being tampered with and produces a box tamper signal when the box is tampered with and provides the box tamper signal to the timer and the transmitter causing the timer to activate the power supply for the predetermined period of time to power the transmitter to the active state so the transmitter transmits wirelessly a box tamper alert signal with coordinates of the transmitter's location when the transmitter receives the box tamper alert signal; and a supervisory circuit in communication with the timer and the transmitter and the power supply which produces at predetermined intervals a status signal that indicates the system is operating properly, and provides the status signal to the timer and the transmitter causing the timer to activate the power supply for the predetermined time period to power the transmitter to the active state so the transmitter transmits wirelessly a status alert signal with coordinates of the transmitter's location when the transmitter receives the status signal.

2. The system of claim 1 including a camera in communication with the detector and the power supply and the transmitter which takes a picture of the object when the camera receives the alarm signal and provides the picture to the transmitter for the transmitter to transmit wirelessly the picture as part of the alarm alert signal.

3. The system of claim 2 wherein the alarm alert signal, the low battery alert signal and the status alert signal each includes a respective recorded text message.

4. The system of claim 2 wherein the alarm alert signal, the low battery alert signal and the status alert signal each includes a respective recorded voice message.

5. The system of claim 4 wherein the transmitter and GPS include a cell phone.

* * * * *